United States Patent [19]

Ventura

[11] 4,076,476
[45] Feb. 28, 1978

[54] DOUGH MOLD PRESS

[75] Inventor: Frank D. Ventura, Commack, N.Y.

[73] Assignee: Ideal Toy Corporation, Hollis, N.Y.

[21] Appl. No.: 743,840

[22] Filed: Nov. 22, 1976

[51] Int. Cl.² ............................................. B29F 3/00
[52] U.S. Cl. .................................... 425/183; 425/190;
425/DIG. 57
[58] Field of Search ............... 425/190, 376, DIG. 57,
425/380, 449, 183, 192

[56] References Cited

U.S. PATENT DOCUMENTS

| | | | |
|---|---|---|---|
| 2,578,105 | 12/1951 | Taylor | 425/DIG. 57 |
| 3,157,933 | 11/1964 | Boggild et al. | 425/190 |
| 3,264,685 | 8/1966 | Boggild et al. | 425/183 |
| 3,590,749 | 7/1971 | Burns et al. | 425/DIG. 57 X |
| 3,685,936 | 8/1972 | Meth et al. | 425/192 |

Primary Examiner—Francis S. Husar
Assistant Examiner—William R. Briggs
Attorney, Agent, or Firm—Richard M. Rabkin

[57] ABSTRACT

A toy extrusion device for use with moldable dough-like material includes an extruder housing, a container defining an extrusion chamber movably mounted in the housing for movement between loading and extruding positions. The container has opposed end portions respectively defining a filling or loading opening and an extrusion opening therein. A plunger is slidably mounted in the housing in position to enter the filling opening of the container in its first position to urge the play materials in the extrusion chamber through the extrusion opening. A manually operable lever is pivotally mounted on the housing for operating the plunger. The lever and the plunger have cooperating means formed thereon for converting pivotal movement of the lever into linear movement of the plunger whereby the plunger may be reciprocated into and out of the extrusion chamber.

11 Claims, 6 Drawing Figures

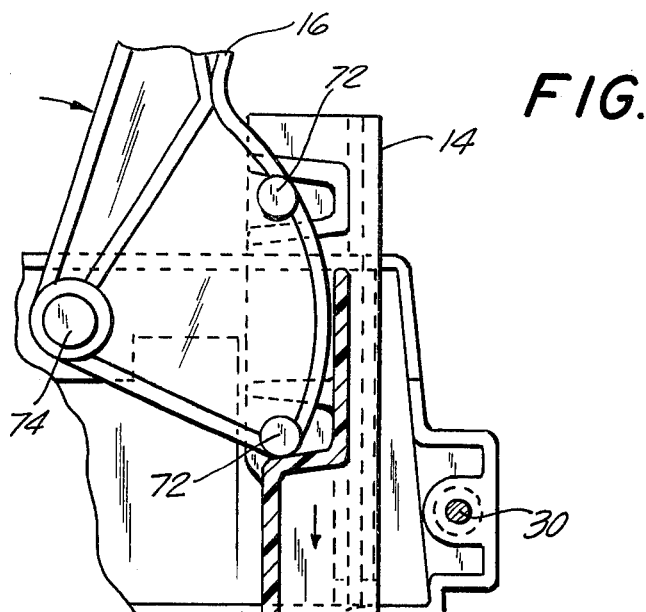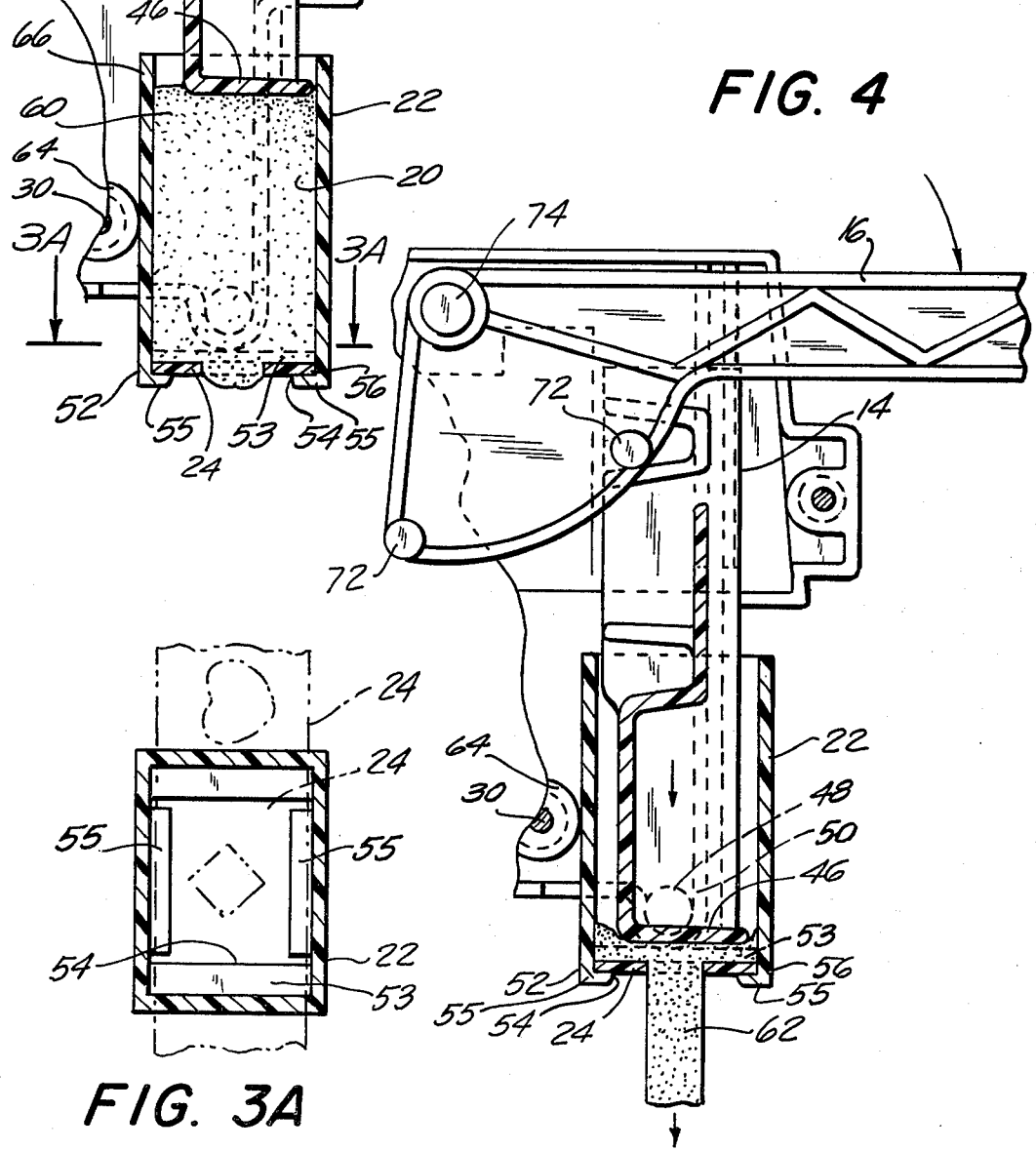

DOUGH MOLD PRESS

The present invention relates to extrusion devices and more particularly to an extruder for use with dough-type moldable and extrudable play material.

Among the large variety of children's toys and play things, one continually successful and popular type of product consists of molding material by which children can model and form various types of articles and characters. Clay of course is one molding material which immediately comes to mind and has been used for generations by children as a play thing, but in more recent times dough-like products which have a softer and more malleable texture, such as for example the "SHAPE AND PLAY" dough-type product currently manufactured and sold by the Ideal Toy Corporation, have achieved a great deal of popularity. These dough-type products can be used by children to form innumerable shapes and articles. They are typically molded by hand, or even used with performed plastic molds.

In order to expand the possible uses of this type of material and the types of articles that can be formed therewith, in order to further enhance the value of this material and its usefulness in entertaining children, the present invention provides an extrusion mechanism which permits the material to be extruded through a die to form any of a multiplicity of shapes. Since the toy is to be used by small children, it is an object of the invention to provide an extruder for the dough-type material which is relatively simple to load and operate, even by a small child.

Another object of the invention is to provide an extruder which has a very simple drive mechanism.

A still further object of the present invention is to provide an extruder which is readily formed from molded plastic materials, and easy to assemble.

A still further object of the present invention is to provide an extruder for dough-like material which is relatively simple in construction and durable in use.

According to one aspect of the present invention the extruder, which is intended to be used with moldable dough-type play material, includes a housing having an extrusion plunger slidably mounted therein for reciprocal movement in a straight or linear path of travel between first and second positions towards and away from a container defining an extrusion chamber which holds the play material. This container is pivotally mounted on the extruder housing for movement between first and second positions with respect to the housing, these positions corresponding to extrusion and loading positions respectively.

The container has opposed end portions which respectively define a filling opening and an extrusion opening, and it is located in the housing such that the filling opening is aligned with the path of travel of the plunger in the first position of the housing, to permit the plunger to enter the filling opening and urge the play material in the extrusion chamber through the extrusion opening.

A drive lever is pivotally mounted on the housing for pivotal movement on an axis spaced from and extending generally perpendicular to the direction of travel of the plunger. The lever and plunger have cooperating means formed thereon for converting pivotal movement of the lever into linear movement of the plunger so that the plunger can be reciprocated into and out of the extrusion chamber, and the plunger will extrude material in the chamber through the extrusion opening, as it moves into the extrusion chamber.

The above, and other objects, features and advantages of this invention will be apparent in the following detailed description of an illustrative embodiment thereof, which is to be read in connection with the accompanying drawing, wherein:

FIG. 3 is a vertical sectional view, similar to FIG. 2, showing the initial movement of the extruder plunger into the extrusion chamber;

FIG. 3A is a sectional view taken along line 3A-3A of FIG. 3;

FIG. 4 is a sectional view similar to FIG. 3 showing the extrusion plunger driven substantially fully into the extrusion chamber of the device.

Figure 1:
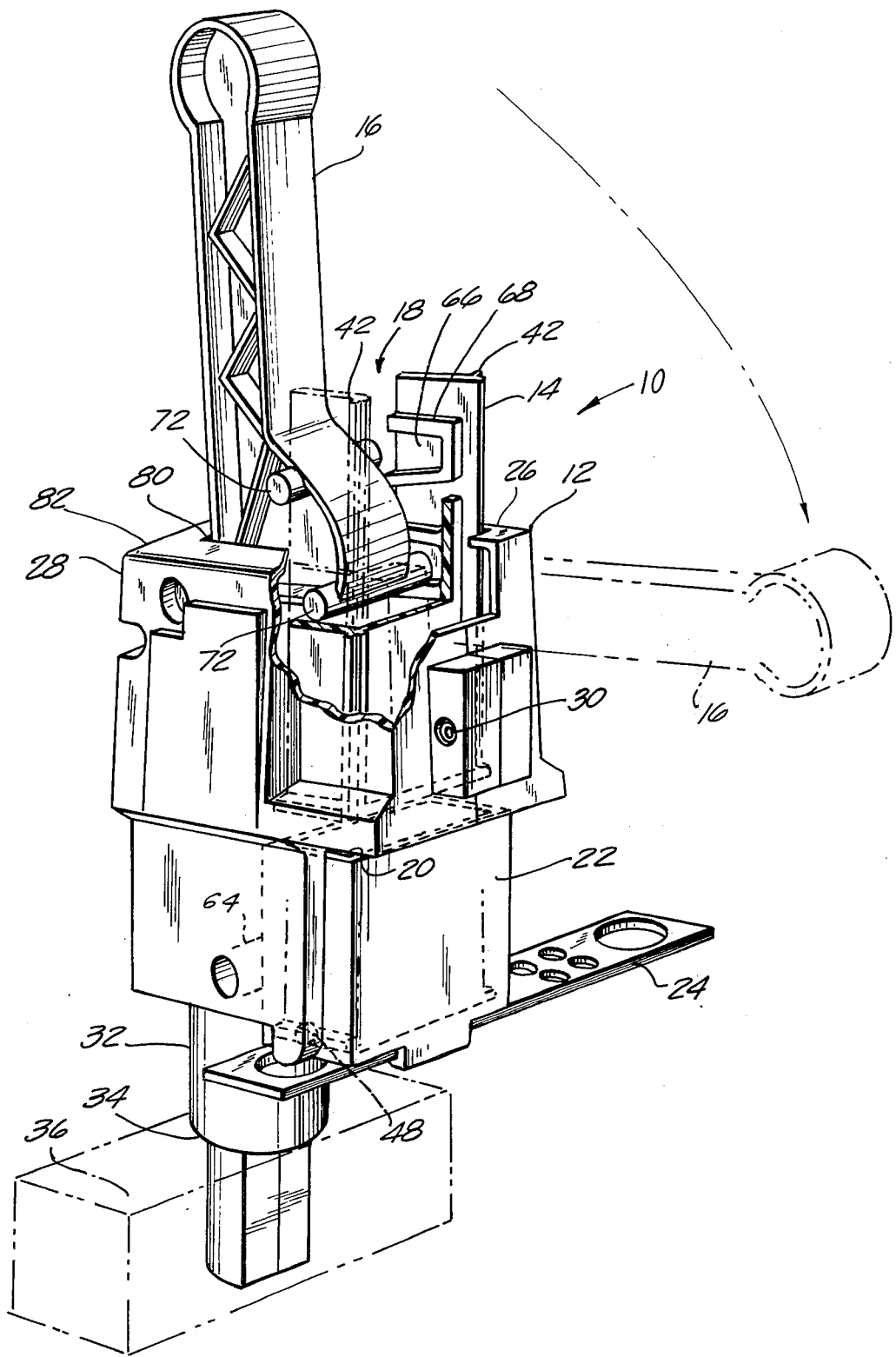
FIG. 1 is a perspective view, with parts broken away, illustrating an extruder device incorporating the present invention therein.

Referring now to the drawing in detail, and initially to FIG. 1 thereof, an extruder 10 is illustrated which includes a housing 12 in which a drive plunger 14 is slidably mounted. The plunger is reciprocated in a generally vertical linear path of travel by a lever 16 which is pivotally mounted in the housing. The lever and plunger include cooperating means 18 which convert the rotary or pivotal movement of the lever into linear movement of the plunger, thereby to move the plunger vertically, into and out of an extrusion chamber 20 defined in a container 22. The latter is adapted to hold the dough-like material which is to be extruded by the aid of the device 10. If desired, a die 24 can be mounted on the container 22, as described hereinafter, to provide a plurality of different shapes or forms through which dough-like material can be extruded from the extrusion chamber 20.

Housing 12 is formed from two substantially identical and complementary molded plastic shells 26, 28 which are secured together in any convenient manner, as for example by rivets 30 or the like.

The housing includes an extension portion or stem 32 whose lower end is adapted to be inserted in the socket 34 of a support stand 36, thereby to support the extruder device in a vertical and stable position. The support stand 36 may take any desired form, and does not form a part in the present invention.

The complementary housing sections 26, 28 have guide slots 38 formed therein (see FIG. 5) defined between cooperating pairs of inwardly extending flanges 40. These slots 38 receive laterally extending flanges 42 formed on opposite sides of plunger 14, thereby to guide the plunger in a linear and generally vertical path of travel during oscillation of lever 16.

Figure 2:
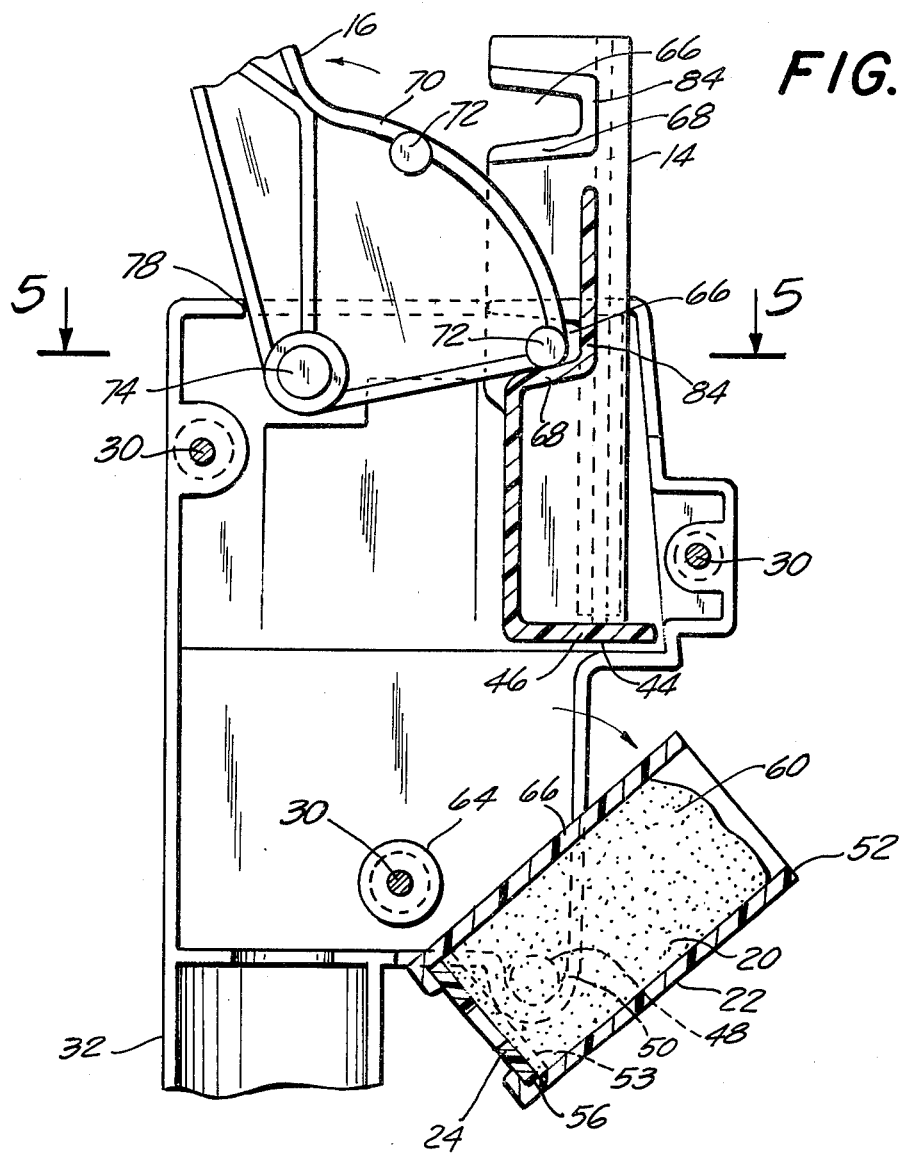
FIG. 2 is a partial longitudinal sectional view of the extruder of FIG. 1 showing the plunger of the extruder in its raised position and the extrusion chamber in a position for loading.
Figure 5:
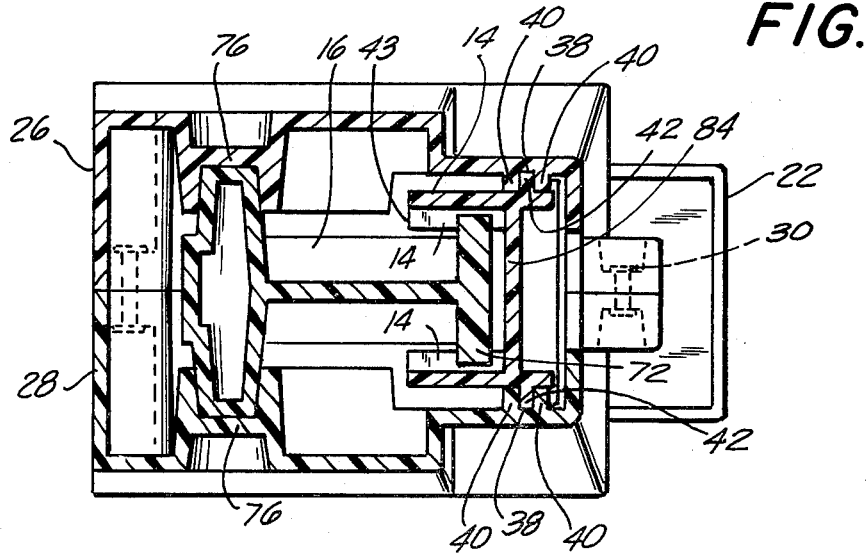
FIG. 5 is a sectional view taken along line 5—5 of FIG. 2.

Plunger 14 is preferably formed as a molded one-piece plastic element which has, at least at the upper portion thereof, a generally U-shaped cross-section, as seen in FIG. 5, including a pair of legs 14' which extend towards lever 16, so that the opening 43 between the legs faces the lever. The lower portion of plunger 14, as seen in FIG. 2, is U-shaped in cross-section, but with the U facing in the opposite direction, and with the bottom end 44 of the plunger being closed off by an integral push plate 46.

Container 22 is generally rectangular in cross-section, and the internal extrusion chamber defined therein is generally complementary in cross-section to push plate 46. The container is pivotally mounted by a pair of integral pins 48 (only one of which is seen in FIG. 1) formed on its two opposite sides, which are received in complementary openings or recesses 50 formed in housing halves 26, 28.

The upper end 52 of the container has an opening formed therein which permits access to the interior, and which allows the plunger to enter extrusion chamber 20 when container 22 is pivoted into the position shown in FIG. 3.

The opposite end or lower wall 53 of container 22, as shown in FIG. 3A, has a smaller opening 54 formed therein defining an extrusion opening through which dough-like play material is extruded upon operation of plunger 14. In addition, lower end 53 of the container 22 has a pair of inwardly directed lips or flanges 55 which define a slot 56 between the bottom wall 53 of the container and the flange, which slot is adapted to slidably receive the die plate 24. In use the child will position the selected die configuration on plate 24 beneath extrusion opening 54 so that the resultant extrudate has the selected cross-sectional shape.

In order to fill the extrusion chamber 20 the child pivots container 22 until the open end 52 thereof faces outwardly, and he then places the dough-like play material 60 in the container in the desired amount. Once extrusion chamber 20 is loaded, the child pivots the container to its vertical position wherein the open end 52 of the container is aligned with push plate 46 on the bottom of plunger 14. By holding the container 22 in this position, and then operating lever 16 as described hereinafter, plunger 14 is lowered from its first raised position illustrated in FIG. 2 into the upper end of the container 22, as illustrated in FIG. 3. Further downward movement of plunger 14, upon further rotation of the lever 16, urges the plunger against the play material 60 in the extrusion chamber. This produces an extruding force on the play material which pushes the play material through the extrusion opening 54 and the selected opening in die plate 24, thereby forming the extrudate 62, as seen in FIG. 4. By returning lever 16 to its original position illustrated in FIGS. 1 and 2, plunger 14 is removed from within the container 22 and the container is free to be pivoted outwardly again by the child for reloading.

If desired, although not absolutely necessary, the housing shells 26, 28 may be provided with stop members or bosses 64 on their inner side walls, positioned to engage the rear wall 66 of container 22, in order to define a limit position at which the open end 52 of the container aligns with the push plate of plunger 14.

The cooperating means 18 formed on the plunger and lever 16 for converting the rotary or pivotal movement of the lever into reciprocal movement of the plunger includes pairs of slots 66 formed on the oppositely facing sides of the parallel legs 14' on the upper end of the plunger. These slots are defined by generally U-shaped embossments 68 which open towards lever 16 so that the slots have openings at their ends facing the lever. The slots 66 on opposite legs 14' are located in lateral alignment with each other and they are spaced vertically with respect to one another along the path of travel of the plunger. This is illustrated most clearly in FIGS. 2–4.

In addition, cooperating means 18 includes a sector shaped portion 70 formed on lever 16 which has pairs of oppositely extending pins 72 formed thereon. These pins are arcuately spaced from one another, through a distance of approximately 60°, and they are respectively associated with slots 66. Lever 16 is pivotally mounted by an integral pin 74 formed thereon and having opposite ends received in pivot pockets 76 formed in housing halves 26, 28 (see FIG. 5). The lever is dimensioned, and its pivotal mounting is located, such that the lower pair of pins 72 enter the lower slots 66 in the plunger, as seen in FIG. 2, when the lever 16 is in its extreme counterclockwise position as illustrated in FIG. 2 wherein the lever engages an edge 78 of an opening 80 in the top 82 of the housing, through which the lever extends. In this position the lower pins 72 are well within lower slots 66, near the front wall or bight portion 84 of the plunger.

Upon pivotal movement of lever 16 in a clockwise direction, in order to depress plunger 14, the lower pair of pins 72 will move in an arcuate path against the lower leg of the embossments 68 defining lower slots 66. This will drive the plunger downwardly. Because the plunger is confined to move in a straight path, and because the pins of course move in an arcuate path, a position will be achieved where the lower pins 72 will move out of lower slots 66. However, at that point, the upper pair of pins 72 have already entered their associated upper slots 66 and become engaged with the lower leg of upper embossments 68. Thus, as the lower pins move out of lower slots 66, upper pins 72 become engaged near the bight portion of the upper embossments 68 with the lower leg of those embossments, whereby continued clockwise rotation of lever 16 is transmitted directly to plunger 14 by these upper pins, and the plunger continues to move downwardly to its fully depressed position illustrated in FIG. 4. In this manner the downward movement of the plunger extrudes the dough-type material from the extrusion chamber 20 through the extrusion die.

When plunger 14 has reached its fully depressed position illustrated in FIG. 4, and the child desires to remove the plunger in order to free the extrusion chamber for refilling, lever 16 is rotated in an opposite, or counterclockwise direction as seen in the drawings, and the cooperation of pins 72 and slots 66 takes place again in the opposite direction. With this counterclockwise rotation of the lever 16, pins 72 engage the upper legs of their associated embossments 68, defining their associated slots 66, in a sequential manner, in the reverse order from that which has previously been described. Thus the plunger is raised by the counterclockwise rotation of the lever, until the plunger has returned to its upper or first position, illustrated in FIG. 2. The container 22 is then freed from the plunger and a child can manually pivot the container outwardly, as shown in FIG. 2, for reloading.

Accordingly, it is seen that a relatively simply constructed durable extrusion device is provided which can be operated even by a small child with a minimum of manual dexterity. The extruder is easily loaded and the extrusion chamber is readily aligned, even by a small child, with the plunger. The pin and slot arrangement for driving the plunger provides a compact and yet durable motion transmission mechanism which serves to multiply the forces applied by a child to the lever, to a degree sufficient to extrude the play material from the extrusion chamber.

Although an illustrative embodiment of the present invention has been described herein with reference to the accompanying drawings, it is to be understood that the invention is not limited to that precise embodiment, but that various changes and modifications may be effected therein by one skilled in the art without departing from the scope or spirit of this invention.

I claim:

1. A toy extrusion device for use with a moldable material comprising a housing, a container defining an extrusion chamber movably mounted in said housing for movement between first and second positions these positions corresponding to extrusion and loading positions and said container having opposed end portions respectively defining an extrusion opening and a filling opening therein, a plunger slidably mounted in said housing and positioned to enter the filling opening of said container in the first position thereof to urge moldable material in the extrusion chamber through said extrusion opening, and a manually operable lever pivotally mounted on said housing, said plunger and lever having cooperating means which comprise two pairs of slots formed in said plunger, slots of each pair being formed in opposite sides of said plunger and extending generally perpendicularly of the path of travel thereof, said pairs of slots being spaced from one another along the plunger in the direction of movement thereof, and two pairs of arcuately spaced pins on said lever respectively associated with said slots and located to sequentially enter and be engaged in their associated slots during pivotal movement of the lever whereby the plunger is moved in a linear direction upon pivotal movement of the lever and the plunger may be reciprocated into and out of said extrusion chamber.

2. A toy as defined in claim 1 wherein said slots have open ends facing the lever through which the pins enter the slots.

3. A toy as defined in claim 1 wherein said housing and plunger have cooperating means formed thereon for guiding the plunger in a linear path of travel.

4. A toy as defined in claim 3 wherein the cooperating means for guiding the plunger in a linear path of travel comprises a straight guide slot formed in said housing and an outwardly extending flange on said plunger received in said slot.

5. A toy as defined in claim 1 wherein said container is pivotally mounted on said housing adjacent the end thereof defining said extrusion opening.

6. A toy as defined in claim 6 wherein the said plunger and extrusion chamber have generally complementary cross sectional configurations whereby the plunger holds the extrusion chamber in the first position thereof during movement of the plunger therein.

7. A toy extrusion device for use with moldable play material comprising a housing, an extrusion plunger slidably mounted in said housing for reciprocal movement in a linear path of travel between first and second positions, a container defining an extrusion chamber therein for holding the play material and pivotally mounted on said housing for movement between first and second positions with respect to the housing with these positions corresponding to extrusion and loading positions, said container having opposed end portions respectively defining a filling opening and an extrusion opening and being located on the housing such that the filling opening thereof is aligned with the path of travel of the plunger to permit the plunger to enter the filling opening and urge material in the extrusion chamber through said extrusion opening; and a drive lever pivotally mounted on said housing for pivotal movement on an exis spaced from and extending generally perpendicular to the direction of travel of the plunger; and cooperating means on said plunger and lever, said cooperating means comprises two pairs of slots formed in said plunger, slots of each pair being formed in opposite sides of said plunger and extending generally perpendicularly of the path of travel thereof, said pairs of slots being spaced from one another along the plunger in the direction of movement thereof, and two pairs of arcuately spaced pins on said lever respectively associated with said slots and located to sequentially enter and be engaged in their associated slots during pivotal movement of the lever whereby the plunger is moved in a linear direction upon pivotal movement of the lever and may be reciprocated into and out of said extrusion chamber.

8. A toy as defined in claim 7 wherein said plunger has a generally U-shaped drive portion including a pair of laterally spaced legs and opening towards said lever; said cooperating means comprising means on each of said legs defining said pairs of slots extending generally perpendicularly of the path of travel of the plunger towards the lever and being spaced from one another along the plunger in the direction of movement thereof; the slots in each of said pairs being laterally aligned with each other and having open ends facing said lever.

9. A toy as defined in claim 8 wherein said means defining said slots comprise generally U-shaped bosses molded on said legs with their open ends facing said lever.

10. A toy as defined in claim 9 wherein said housing includes at least one straight guide slot formed therein parallel to the path of travel of the plunger and an outwardly extending flange on said plunger received in said slot whereby said guide slot and flange cooperate to guide said plunger in a straight path of travel during reciprocation of the lever.

11. A toy as defined in claim 10 wherein the said plunger and extrusion chamber have generally complementary cross sectional configurations whereby the plunger holds the extrusion chamber in the first position thereof during movement of the plunger therein.

* * * * *